Dec. 25, 1956  E. H. ENGVALL  2,775,425
WEIGHING AND BAGGING MACHINE
Filed Oct. 18, 1954  2 Sheets-Sheet 1

INVENTORS
EARL H. ENGVALL
BY Williamson, Williamson,
Schroeder & Adams
ATTORNEYS Dec. 25, 1956  E. H. ENGVALL  2,775,425
WEIGHING AND BAGGING MACHINE
Filed Oct. 18, 1954  2 Sheets-Sheet 2

INVENTOR
EARL H. ENGWALL
BY Williamson, Williamson,
Schroeder & Adams
ATTORNEYS 2,775,425

WEIGHING AND BAGGING MACHINE

Earl H. Engvall, Minneapolis, Minn.

Application October 18, 1954, Serial No. 462,713

4 Claims. (Cl. 249—46)

This invention relates to weighing and packaging machines, and more specificaly relates to machines for weighing and bagging materials which are of such shape and size so as to be non-free-flowing.

One of the most important features of a machine for weighing and packaging materials is the speed at which such a machine can operate. Although many such machines have been developed in the past, a high rate of packaging cannot be attained because of one or more limitations in the construction and operation of the machines. Difficulty is frequently had in quickly supplying potatoes to the weighing mechanism because periodically during the operation of the machine the rate of supplying potatoes to the weighing mechanism must be substantially reduced. In addition, difficulty is had in some machines in rapidly discharging the weighed portions from the weighing mechanism and conveying the weighed portions to the bag into which they are to be deposited. This problem is particularly acute in bagging of potatoes and other similar products where some of the potatoes have an elongated shape which if turned crosswise when entering the bag may get stuck and cause jamming and congestion of the other potatoes being delivered to the bag. In addition jamming at the entrance to the bag is frequently caused when all of the potatoes of a weighed portion are substantially simultaneously delivered to the bag opening.

Another of the most important features of a machine for packaging materials such as potatoes and the like is the accuracy with which such a machine can measure the portions of material. It is obvious that the weighed portions must not contain less than a predetermined weight of material and it is highly desirable that the overweight of the portions of material be kept at an absolute minimum. This problem of maintaining accuracy in the weight is directly related to the speed at which the machine can operate. When some machines run at a high rate of speed they cannot instantaneously stop the flow of potatoes to the weighing mechanism when the desired weight is attained and therefore several potatoes will be delivered to the weighing mechanism and therefore be discharged with the weighed portion to cause an overweight. Other machines seek to minimize the overweight of the portions of material by decreasing the speed at which the potatoes are supplied to the weighing mechanism. It will therefore be seen that the speed and accuracy of a weighing and packaging machine are directly interrelated.

Therefore, with these comments in mind, it is to the solution of these and other problems to which my invention is directed along with the inclusion therein of other desirable features.

A general object of my invention is to provide a machine for rapidly weighing predetermined amounts of non-free-flowing materials such as potatoes and for discharging such material for readily and easily packaging thereof.

Another object of my invention is to provide a machine of the class described which rapidly dumps the weighed materials from the weighing mechanism in an agglomerate and which arranges the agglomerated materials for rapid and positive discharge into a bag.

Still another object of my invention is to provide a machine of the class described which rapidly dumps the weighed materials from the weighing mechanism in an agglomerate and which combinatively conveys such materials for deposit into a bag, strings out the materials into an elongated agglomerate and aligns elongated articles, such as russet potatoes, with the direction of shifting of the agglomerate to assure rapid and unhindered deposit of the materials into the bag.

A further object of my invention is to provide a machine of the class described which rapidly measures within close tolerances and segregates predetermined portions of material.

A still further object of my invention is to provide a machine of the class described which includes an improved weighing container, the inlet and outlet gates of which are operated by weight-sensitive electric control mechanism.

In addition, another object of my invention is to provide a machine of the class described which continuously supplies material to the weighing mechanism for delivery to the weighing container during the weighing operation and for temporary storage during the dumping operation of the weighing mechanism to provide an initial charge for the weighing container in the next successive weighing operation.

These and other objects and advantages of my invention will more fully appear from the following description made in connection with the accompanying drawings wherein like reference characters refer to the same parts throughout the several views and in which:

Fig. 4 is a detail view of a portion of my invention taken on a vertical plane substantially at 4—4 of Fig. 1;

Fig. 6 is a detail view of the time delay mechanism forming a part of the electrical circuit shown in Fig. 5 and being cooperatively associated with the gate actuating mechanism of the weighing mechanism of my machine.

Figure 1:
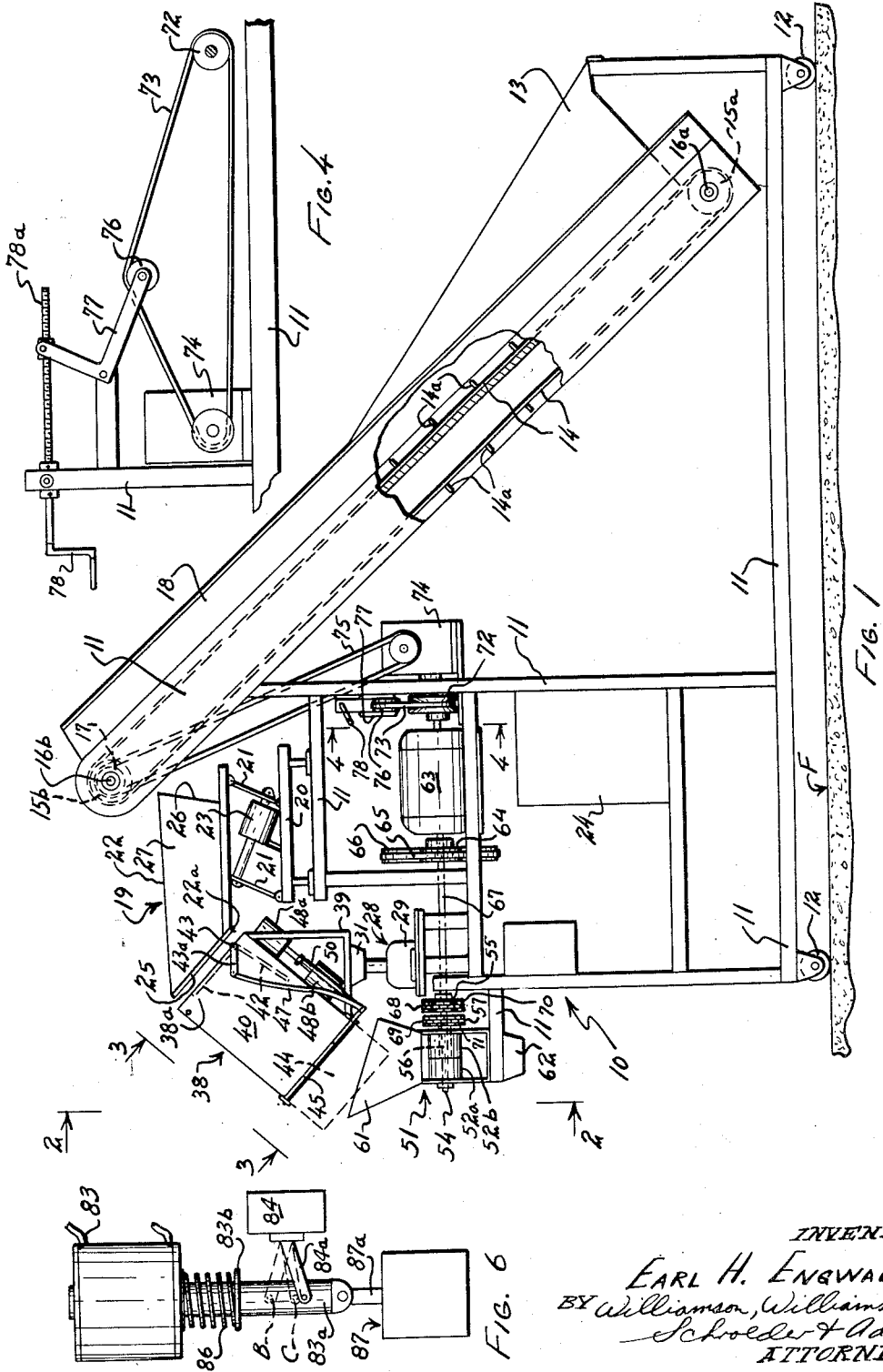
Fig. 1 is a side elevation view of the machine including my invention.
Figures 2, 3:
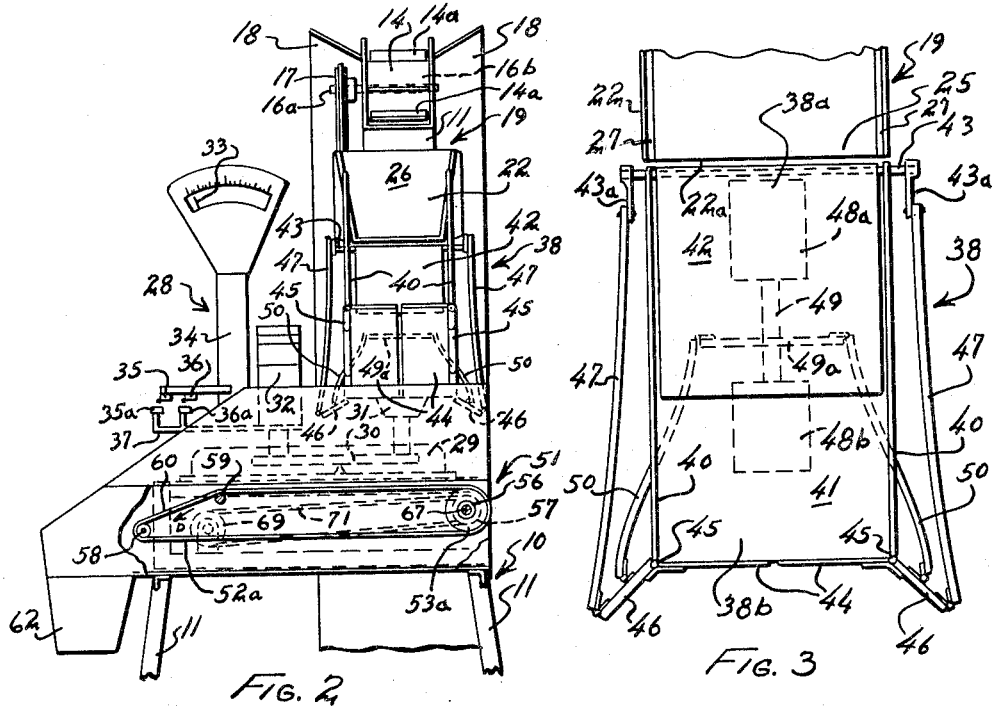
Fig. 2 is an end elevation view of the machine including my invention and taken substantially at 2—2 of Fig. 1.
Fig. 3 is a detail view of a portion of my invention taken on an inclined plane substantially at 3—3 of Fig. 1.

The machine 10 including my invention is shown having a supporting framework 11 which is supported as by wheels 12 on a solid foundation such as concrete floor F. A bulk material hopper 13 or bin is provided adjacent to one end of the machine 10 and is cooperatively associated with an elevating conveyor 14 which is inclined upwardly from bin 13 toward the medial portion of machine 10 and which forms the bottom of bin 13. Conveyor 14 comprises an endless conventional type conveyor belt having a plurality of paddles 14a mounted on the material-carrying surface thereof and conveyor 14 is carried by pulleys 15a and 15b which are respectively secured to shafts 16a and 16b. Shafts 16a and 16b are journalled in frame 11, and shaft 16b has an outstanding end portion to which power transmission pulley 17 is attached. Upstanding side walls 18 are secured adjacent to conveyor 14 and on opposite sides thereof for retaining material on conveyor when carried thereby.

A material-feeding conveyor, designated in general by numeral 19, is provided adjacent to the upper end portion of conveyor 14 to receive and carry material discharged thereby. In the form shown conveyor 19 is of the vibrating or oscillating type and may be operated at at least two speeds. Vibrator conveyor 19 is of the conventional type including a base 20 mounted on frame 11, inclined leaf springs 21 mounted on base 20, conveying receptacle 22 suitably mounted on and supported by the upper end portions of leaf springs 21, and an actuating solenoid 23 having its shiftable core attached to weighing receptacle 22 for shifting the same. Solenoid 23 is powered from a vibrator control mechanism 24 which supplies pulsating electric current at controllably varying magnitudes to solenoid 23. Conveyor receptacle 22 has an open discharge end portion 25 and a closed rear end portion 26, and has upstanding retaining walls 27 which extend outwardly beyond the discharge end of the bottom 22a of receptacle 22. The operation of the vibrating conveyor 19 is well known and is similar to the operation of all conventional types of vibratory conveyors.

I also provide a scale mechanism designated in general by numeral 28 which is mounted on frame 11 and includes a base 29, a balance arm 30 fulcrumed in base 29 and having a weighing platform 31 mounted on one end thereof and having counterweights 32 mounted on the opposite end thereof. Scale 28 also includes an indicator arm 33 connected to balance arm 30 by a suitable linkage mechanism (not shown) which passes through indicator housing 34. A pair of microswitches 35 and 36 are affixed to the indicator housing 34. Switch actuating members 35a and 36a are secured as by supporting arm 37 to the balance arm 30. Switch actuating members 35a and 36a may be vertically adjustable to permit actuation of the respective microswitches 35 and 36 at different positions of balance arm 30.

A weighing receptacle or weigh box 38 is mounted on weighing platform 31 of scale 28 and is secured thereto by suitable means such as framework 39. Receptacle 38, which has an inlet portion 38a and an outlet portion 38b, is mounted with the inlet portion 38a thereof in proximity with the discharge end of conveyor 19 to receive material therefrom. Receptacle 38 includes upstanding side walls 40 and inclined bottom 41 which slopes downwardly from the inlet portion 38a of receptacle 38 to the outlet portion 38b thereof.

An inlet gate 42 is mounted in the inlet portion 38a of weighing receptacle 38 and is horizontally hinged on shaft 43 adjacent to the bottom 41 of receptacle 38. In closed position, inlet gate 42 is inclined, sloping outwardly and upwardly from the discharge end portion 25 of conveyor 19. In open position gate 42 extends substantially parallel to the inclined bottom 41 of receptacle 38. Crank arms 43a are fixedly secured to the ends of shaft 43 to shift inlet gate 42.

A pair of shutter-type outlet gates 44 are mounted in the outlet portion 38b of weighing receptacle 38 and are swingably mounted to sidewalls 40 as by hinges 45. Shutter gates 44 extend across the outlet portion 38b of receptacle 38 in closed position, and swing outwardly into substantial alignment with sidewalls 40 in open position. Actuating arms 46 are fixedly secured to gates 44 and extend laterally of weighing receptacle 38.

Inlet gates 42 and outlet gates 44 are interconnected by suitable linkage mechanism to shift substantially simultaneously. Such linkage mechanism includes interconnecting links 47 which extend between and are hingedly connected to the respective crank arms 43a and 46 of inlet gate 42 and of outlet gates 44 respectively. Connecting links 47 may be slightly flexible and resilient to allow slight camming at the interconnection with arms 43a while a substantially linear movement is produced by shifting of arms 46.

Gate actuating mechanism is provided for shifting the inlet gate 42 and outlet gates 44, and in the form shown, includes a pair of solenoids 48a and 48b having their cores 49 aligned and interconnected. Solenoids 48a and 48b are mounted on framework 39 below the bottom 41 of receptacle 38. An extension member 49a extends laterally of and outwardly from cores 49. Interconnecting links 50 are each hingedly connected between the opposite ends of extension member 49a and the gate actuating arms 46. When solenoid 48a is energized and solenoid 48b is deenergized, the cores 49 and extension member 49a shift rearwardly of weighing receptacle 38 to open the outlet gates 44 and to close inlet gate 42, and when solenoid 48b is energized and solenoid 48a is de-energized, cores 49 shift forwardly of weighing receptacle 38 to close outlet gates 44 and open inlet gate 42.

A material discharging mechanism indicated in general by numeral 51 is provided adjacent to the outlet portion 38b of receptacle 38. Discharging mechanism 51 includes a pair of material discharge conveyors 52a and 52b which, in the form shown, are of the conveyor belt type and carry material in overlying relation thereon. Conveyor belts 52a and 52b each have a material-receiving portion and a discharge end portion. The juxtaposed conveyor belts 52a and 52b extend substantially parallel to each other and travel in the same direction as indicated by arrow D. Belts 52a and 52b travel at different speeds relative to each other, with belt 52a traveling faster than belt 52b. The conveyor belt 52a is supported and powered by pulley 53a which is secured to shaft 54 for rotation therewith. A sprocket wheel 55 is mounted on shaft 54 to turn therewith and to transmit power thereto. Conveyor 52b is supported and driven by another pulley adjacent to pulley 53, which is mounted on sleeve 56 which is concentrically mounted in relation to shaft 54. Sprocket wheel 57, which is somewhat larger in diameter than sprocket wheel 55, is mounted on sleeve 56 to turn therewith and to transmit power thereto.

The other ends of conveyor belts 52a and 52b are carried by idler rollers 58 and 59, with idler rollers 58 being positioned below rollers 59 to provide a downwardly inclined discharge end portion 60 of conveyors 52a and 52b.

A hopper 61 is formed above the material receiving portions of conveyors 52a and 52b and includes upstanding sidewalls to guide the materials discharged from receptacle 38 onto the conveyors. A bagging spout 62 is formed adjacent to the discharge end portions 60 of conveyor belts 52a and 52b and opens upwardly to receive material therefrom. Bagging spout 62 opens downwardly through a diminished lower end portion to feed material into a bag which may be placed with its upper open end in communication therewith.

Motor 63 is provided to supply rotative power for elevator conveyor 14 and for discharge conveyors 52a and 52b. From one end of motor 63 power is supplied through pulley 64 and belt 65 to pulley 66 which is secured to shaft 67. Shaft 67 is journalled in frame 11 and extends toward the discharge conveyors 52a and 52b. Sprocket wheels 68 and 69 are mounted on shaft 67 to turn therewith and to supply rotative power to sprocket wheels 55 and 57 through chains 70 and 71 respectively.

The other end of motor 63 supplies power to conveyor 14 through a variable speed pulley 72 mounted on the motor spindle, belt 73, gear box 74 and belt 75 which interconnects gear box 74 and pulley 17 of conveyor 14. As best shown in Fig. 4 a variable speed feature is provided for conveyor 14 by pulley 76 which is mounted on a shiftable support arm 77 and which moves upwardly to tighten pull belt 73 down toward the central portion of variable speed pulley 72 to decrease the speed of elevator conveyor 14. Support arm 77 is controllably shifted by crank 78 which is mounted in frame 11 and which has an outstanding threaded end portion 78a to which support arm 77 is threadably and swingably connected. When pulley 76 is shifted upwardly the speed of conveyor 14 is decreased and when pulley 76 is lowered, the speed of conveyor 14 is increased.

Figure 5:
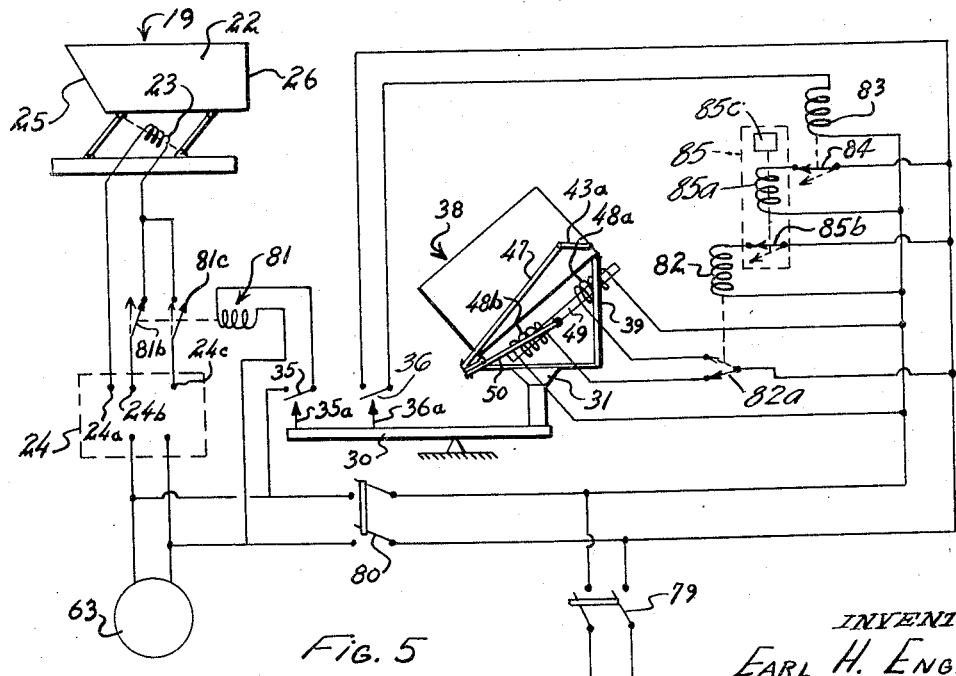
Fig. 5 is a diagrammatic representation of the cooperating electrical and mechanical system included in my invention.

Weight responsive control means is provided, as best shown in Fig. 5, to operate the inlet and outlet gates of weighing receptacle 38 and to control speed of operation of conveyor 19. A source of electric current is provided through manual switch 79 to supply power to the vibrator control mechanism 24 and vibrator solenoid 23, to motor 63, and to the gate actuating solenoids 48a and 48b. Operation of conveyor 19 and motor 63 is controlled by manual switch 80.

One side of solenoid 23 of conveyor 19 is connected to terminal 24a of control mechanism 24. The other side of solenoid 23 is connected selectively to either terminal 24b or terminal 24c via the shiftable contactors 81b and 81c of relay 81. When solenoid 23 is connected between terminals 24a and 24b of control mechanism 24 the vibrator conveyor 19 will operate at high speed; and when solenoid 23 is connected between terminals 24a and 24c of control mechanism 24 vibrator conveyor will operate at a reduced speed. Solenoid 23 is selectively connected to one of the terminals 24b or 24c of control mechanism 24 by operation of relay 81. When the winding of relay 81 is energized by closing of microswitch 35, the contactors thereof will shift to cause vibrator conveyor 19 to operate at reduced speed.

Gate actuating solenoids 48a and 48b are selectively connected to the source of current by operation of relay 82 which, when energized, shifts the contacts 82a thereof to energize solenoid 48a and to de-energize solenoid 48b. When relay 82 is de-energized, contacts 82a are shifted again to energize gate actuating solenoid 48b and to de-energize solenoid 48a.

Operation of relay 82 is controlled by microswitch 36 which, when closed, energizes solenoid 83 to open switch 84 thereof which in turn de-energizes solenoid 85a of timer 85 which instantaneously opens contacts 85b thereof. When contacts 85b are opened, the normally energized relay 82 is de-energized, which results in shifting of contacts 82a thereof to de-energize solenoid winding 48a and to energize solenoid winding 48b for opening discharge gates 44.

Timer 85 has a hydraulically operated time delay mechanism 85c, which is connected to contacts 85b thereof, to create a time delay in the closing of the contacts after energization of the winding 85a. The mechanism, which is adjustable and in the instant circuit, is set to cause a delay of approximately one-half second. After winding 85a is de-energized by opening of switch 84, a momentary delay is required before the winding 85a may again be energized to start the timing cycle. Switch 84 is adapted to cause a momentary delay between opening of microswitch 36, which occurs substantially instantaneously after closing thereof because potatoes are discharged from the weighing box as soon as the gates are opened to reduce the weight in the box, and the energization of winding 85a of timer 85.

As best shown in Fig. 6 switch 84 is of a common variety toggle switch having a shiftable toggle arm 84a for controlling the operation of the switch contactors. When toggle arm 84a is shifted to dotted position B, the contacts of switch 84 are opened, and when the toggle arm 84a is shifted toward that position shown in full lines, the contacts of switch 84 will not close until there has been substantial movement of arm 84a substantially to dotted position C. The toggle arm 84a of switch 84 is swingably connected to the shiftable core 83a of solenoid 83. A compression spring 86 is mounted on core 83a as by collar 83b to cause core 83a to return to the full line position shown when the windings of solenoid 83 are de-energized.

An air dashpot 87 is provided to decrease the rate of return of core 83a upon de-energization of the winding of solenoid 83. The shiftable rod 87a of air dashpot 87 is connected to the outstanding end portion of core 83a to shift therewith. When solenoid 83 is energized, core 83a and rod 87a of dashpot 87 instantaneously shift into position B to open toggle switch 84. When solenoid 83 is de-energized, compression spring 86 returns core 83a and rod 87a of dashport 87 to their original positions, but dashpot 87 slows the shifting of core 83 in its return stroke to cause a time delay from the de-energization of solenoid 83 to the re-closing of toggle switch 84 which occurs when toggle arm 84a substantially reaches position C as shown. A delay is thereby provided between the opening of microswitch 36 and the energization of winding 85a of timer 85 after which the timing cycle thereof is started. After energization of winding 85a, a controlled time delay will elapse, at the end of which contacts 85b will again close to energize relay 82 and to shifts contacts 82a thereof for closing the discharge gates 44.

*Operation*

When manual switch 79 is closed, gate actuating solenoid 48b is energized to close outlet gates 44 and to open inlet gate 42 and to maintain said gates in their respective positions. When manual switch 80 is closed motor 63 is started to cause operation of elevating conveyor 14 and of discharge conveyors 52a and 52b, and vibrating conveyor 19 is actuated to operate at high speed. Conveyor 14 carries the material, such as potatoes from hopper 13 over the upper end portion of conveyor 14. The potatoes are deposited into the receptacle 22 of vibrating conveyor 19 and are conveyed therethrough toward the inlet portion 38a of weighing receptacle 38. Because the inlet gate 42 of weighing receptacle 38 is open and inclined downwardly substantially parallel to the bottom 41 of receptacle 38, the potatoes will fall into weighing receptacle 38 and against the outlet gates 44 when discharged from vibrating conveyor 19. As the weight of potatoes in weighing receptacle 38 is increased, the balance arm 30 will shift to cause microswitch actuators 35a and 36a to move upwardly into proximity with the microswitches 35 and 36 respectively. As the weight of potatoes in receptacle 38 closely approaches the weight of the portions being measured, switch actuator 35a engages microswitch 35 causing the same to close.

Closing of microswitch 35 causes energization of relay winding 81 which causes contactors 81b and 81c to shift, contactor 81b opening and contactor 81c closing. Closing of contactor 81c causes vibrating conveyor 19 to operate at a reduced speed to supply potatoes to weighing receptacle 38 at a reduced rate. If ten pound portions of potatoes are to be weighed, switch actuator 35a will be adjusted to close microswitch 35 when the weight of potatoes in receptacle 38 has reached approximately nine and one-half pounds. When the full portion of potatoes, such as ten pounds, has been deposited in receptacle 38, switch actuator 36a moves upwardly to close microswitch 36.

Closing of microswitch 36 causes energization of solenoid 83 to open switch 84 thereof for de-energizing timer 85 and opening of contacts 85b. This causes de-energization of relay 82 which shifts contactors 82a thereof to energize solenoid 48a and de-energize solenoid 48b and thereby cause shifting of cores 49 thereof which results in substantially simultaneous operation of outlet gates 44 and inlet gate 42, outlet gates 44 opening and inlet gate 42 closing. When outlet gates 44 of receptacle 38 swing outwardly to open, potatoes will fall from weighing receptacle by gravity onto discharge conveyors 52a and 52b. After only a small quantity of potatoes have been discharged from weighing receptacle 38, balance arm 30 of scale 28 will again start shifting and switch actuators 35a and 36a will shift downwardly to permit microswitches 35 and 36 respectively to open.

Opening of microswitch 35 causes de-energization of relay 81 which results in shifting of the contactors 81b into closed position and contactors 81c into open position.

Vibrator conveyor 19 will thereupon resume operating at a high rate of speed causing potatoes to be supplied at an increased rate toward the closed inlet gate 42 of weighing receptacle 38. Because inlet gate 42 is inclined upwardly and outwardly from the discharge end portion 25 of vibrating conveyor 19, a supply of potatoes will be piled against inlet gate 42 to provide an initial charge of potatoes to be supplied to weighing receptacle 38 as soon as inlet gate 42 is opened during the next successive weighing operation. Because weighing receptacle 38 is performing the dumping operation while inlet gate 42 is closed, the weight of potatoes built up against inlet gate 42 will not affect the weighing of potatoes in receptacle 38.

Microswitch 36 will open substantially simultaneously with the opening of microswitch 35, after only a small quantity of potatoes have been discharged through the open outlet gates 44. Opening of microswitch 36 causes de-energization of solenoid 83. Operation of air dashpot 87 causes a delay in the re-closing of toggle switch 84 after the de-energization of solenoid 83. The time delay allows timer 85 to set to start the time delay cycle thereof. During the time delay caused by timer 85 which will be approximately one-half second, all of the potatoes will be dumped from receptacle 38.

When contacts 85b close, relay 82 is energized to cause shifting of contactors 82a to de-energize solenoid 48a and to energize gate actuating solenoid 48b which closes outlet gates 44 and opens inlet gate 42. The quantity of potatoes having been stored against the inclined inlet gate 42 are thereupon dumped into weighing receptacle 38 and another weighing operation is commenced. It will be remembered that vibrating conveyor 19 is already operating at high speed.

The speed of conveyor 14 which supplied potatoes to vibrating conveyor 19 will be adjusted by turning of crank 78 so as to cause conveyor 14 to supply potatoes at a proper rate of speed.

When the potatoes are discharged from weighing receptacle 38, they are collected on conveyor belts 52a and 52b in an agglomerate and are heaped in a pile. Because discharge conveyor 52a is traveling at a higher rate of speed than is conveyor 52b, the potatoes carried by conveyor 52a will travel faster than those carried by conveyor 52b and will reach the discharge end portion 60 thereof sooner than those carried by conveyor belt 52b. The result of the operation of the discharge conveyor belts 52a and 52b is the stringing out or dispersing of the potatoes into an elongated agglomerate so that all of the potatoes do not reach the bagging spout 62 at the same instant. Jamming up of the potatoes in the bagging spout for this reason is thereby prevented.

In addition, the different speeds of operation of the conveyor belts 52a and 52b provides efficient handling of elongated objects such as russet potatoes. Because such an elongated potato would jam up the bagging spout if it were positioned across the upper portion of the spout 62 at it was directed thereto for the purpose of being deposited in the bag, it is desirable to align the elongated potato in the direction of shifting. If such an elongated russet potato is deposited across both of the conveyor belts 52a and 52b, the end portion of the potato resting on conveyor 52a will travel faster than the end portion of the potato resting on conveyor 52b and therefore, the potato will be turned so as to be aligned with the direction of travel of the conveyor belts. By the time the potato has reached the discharge end portion 60 of the conveyor belts, it will have been properly positioned for deposit into the bag through spout 62.

The inclined discharge portions 60 of conveyor belts 52a and 52b direct the potatoes in a downward direction to aid in the guiding of such potatoes through the bagging spout 62.

I have found that with proper adjustment of microswitch actuators 35a and 36a and with proper adjustment of the speed of elevating conveyor 14, my machine will measure to a high degree of accuracy at least fifteen ten-pound bags of potatoes a minute.

It will be seen that I have provided a machine for rapidly and accurately measuring predetermined portions of non-free-flowing materials, such as potatoes, and which arranges such materials for rapid and positive discharge and packaging thereof. This is accomplished by stringing out the agglomerate of materials dumped from the weighing mechanism and by arrangeing individual articles in the mass for ready and easy deposit into a bag.

It will also be apparent that I have provided a machine for measuring and segregating accurately weighed portions of non-free-flowing material, such as potatoes, which machine is provided with weight sensitive electric control mechanism for causing simultaneous discharge of accurately weighed portions of material and temporary storage of a quantity of such material to provide an initial charge in the weighing mechanism for the next successive weighing operation. Because of the substantially continuous operation of the supplying mechanism, no delay is had in the weighing operation for the building of a weighed portion in the weighing receptacle.

It will, of course, be understood that various changes may be made in the form, detail, arrangement and proportion of the parts without departing from the scope of my invention which consists of the matter described herein and set forth in the appended claims.

What is claimed is:

1. A machine for measuring and segregating accurately weighed portions of material composed of a mass of individual articles, said machine having in combination a scale mechanism including a weighing receptacle having inlet and outlet portions, a shiftable outlet gate mounted in the outlet portion of said receptacle, a multi-speed continuously operated material-feeding conveyor having a discharge end positioned above the inlet portion of said receptacle and discharging material therein, a horizontally hinged flop gate associated with the inlet portion of said receptacle and having a lower end adjacent to the discharge end of said conveyor, said inlet gate being shiftable inwardly of said receptacle to open position, and said inlet gate in closed position being inclined upwardly and outwardly from the discharge end of said conveyor to store a quantity of material thereon which is discharged from said conveyor and weight-responsive control mechanism connected in controlling relation with said conveyor and in controlled relation with said scale mechanism, said control mechanism being constructed and arranged to cause high speed operation of said conveyor when said receptacle contains a predetermined fraction of the weight of material portions to be measured, whereby to feed, during the discharge of material from the weighing receptacle, material at high speed against said inlet gate for subsequent dumping into the weighing receptacle.

2. A machine for measuring and segregating accurately weighed quantities of material composed of a mass of individual articles, said machine having in combination a scale mechanism including a weighing receptacle having inlet and outlet portions and having a bottom, a continuously operated two speed vibrator-type conveyor having a discharge end in proximity with the inlet portion of said receptacle and discharging such material therein, a shiftable outlet gate mounted in the outlet portion of said receptacle, a flop gate horizontally hinged in the inlet portion of said receptacle and adjacent to the bottom thereof and adjacent to the discharge end of said conveyor and being shiftable inwardly of said receptacle to open position, and said flop gate in closed position being inclined upwardly and outwardly from the discharge end of said conveyor in closed position to store a quantity of materials thereon which is discharged from said conveyor and weight-responsive control mechanism connected with said conveyor for increasing the speed thereof upon discharge of a predetermined fraction of the weighed quantity from the recepacle.

3. A machine for measuring and segregating accurately weighed portions of a material composed of a mass of individual articles, said machine having in combination a scale mechanism including a weighing receptacle having inlet and outlet end portions, a multispeed material-feeding conveyor having a discharge end in proximity with the inlet end portion of said receptacle and discharging material therein, an outlet gate swingably mounted in the outlet portion of said receptacle, a shiftable inlet gate associated with the inlet end portion of said receptacle and being inclined upwardly and outwardly from the discharge end of said conveyor in closed position, linkage mechanism interconnecting said gates for opening and closing the same, said outlet gate being in closed position when said inlet gate is in open position, actuating mechanism associated with said linkage mechanism for shifting the same, and weight responsive control means operatively associated with said scale mechanism and with said conveyor, said control means increasing the speed of said conveyor upon discharge of a predetermined fraction of the weighed portion of material from said receptacle, whereby to build a supply of material against said inlet gate for dumping into the receptacle after the receptacle has been emptied.

4. A machine for measuring and segregating accurately weighed quantities of a material composed of a mass of individual articles, said machine having in combination a scale mechanism including a weighing receptacle having inlet and outlet portions, a multi-speed material-feeding conveyor having a discharge end above the inlet end of said receptacle and discharging material therein, an outlet gate swingably mounted in the outlet portion of said receptacle, a shiftable inlet gate associated with the inlet portion of said receptacle and being inclined upwardly and outwardly from the discharge end of said conveyor in closed position, linkage mechanism interconnecting said gates for opening and closing the same, said outlet gate being in closed position when said inlet gate is in open position, actuating mechanism associated with said linkage mechanism for shifting the same, weight-responsive control means operatively associated with said scale mechanism and with said actuating mechanism and constructed and arranged to cause opening of said outlet gate when a predetermined quantity of material is contained in said receptacle, time-responsive control means operatively associated with said actuating mechanism and constructed and arranged to cause closing of said outlet gate after a predetermined time delay subsequent to the opening thereof, and weight-responsive control mechanism connected in controlled relation with said scale mechanism and in controlling relation with said conveyor, said control mechanism being constructed and arranged to cause high speed operation of said conveyor when less than a predetermined fraction of the quantity of material to be weighed is contained in said receptacle.

References Cited in the file of this patent

UNITED STATES PATENTS

| | | |
|---|---|---|
| 669,704 | Perry | Mar. 12, 1901 |
| 1,069,362 | Wegner | Aug. 5, 1913 |
| 2,111,921 | Bleam | Mar. 22, 1938 |
| 2,327,367 | Nowak | Aug. 24, 1943 |
| 2,466,386 | Curioni | Apr. 5, 1949 |
| 2,614,786 | Caron | Oct. 21, 1952 |
| 2,705,607 | Inglett | Apr. 5, 1955 |